United States Patent
Nachtigal

(10) Patent No.: US 9,678,745 B2
(45) Date of Patent: Jun. 13, 2017

(54) AUTOMATIC SUBMISSION OF APPLICATIONS TO APPLICATIONS STORES

(71) Applicant: PapTap LTD, Rishon Letzion (IL)

(72) Inventor: Ira Nachtigal, Rishon Letzion (IL)

(73) Assignee: PAPTAP LTD, Rishon Letzion (IL)

( * ) Notice: Subject to any disclaimer, the term of this patent is extended or adjusted under 35 U.S.C. 154(b) by 0 days.

(21) Appl. No.: 15/077,343

(22) Filed: Mar. 22, 2016

(65) Prior Publication Data

US 2016/0202969 A1    Jul. 14, 2016

Related U.S. Application Data

(63) Continuation-in-part of application No. 14/926,010, filed on Oct. 29, 2015, now abandoned, which is a continuation of application No. 13/751,551, filed on Jan. 28, 2013, now Pat. No. 9,176,726.

(51) Int. Cl.
| | |
|---|---|
| G06F 9/44 | (2006.01) |
| G06F 9/445 | (2006.01) |
| H04L 29/08 | (2006.01) |
| H04W 4/00 | (2009.01) |

(52) U.S. Cl.
CPC ............ *G06F 8/71* (2013.01); *G06F 8/60* (2013.01); *H04L 67/34* (2013.01); *H04W 4/001* (2013.01); *H04W 4/003* (2013.01); *G06F 9/445* (2013.01)

(58) Field of Classification Search
None
See application file for complete search history.

(56) References Cited

U.S. PATENT DOCUMENTS

| | | |
|---|---|---|
| 6,496,979 B1 | 12/2002 | Chen et al. |
| 8,261,231 B1 | 9/2012 | Hirsch et al. |
| 9,088,656 B2 | 7/2015 | Mezhibovsky et al. |
| 2003/0071718 A1 | 4/2003 | Kelly et al. |
| 2005/0257209 A1 | 11/2005 | Adams et al. |
| 2006/0073785 A1 | 4/2006 | Klassen et al. |
| 2006/0161646 A1 | 7/2006 | Chene et al. |
| 2006/0259462 A1* | 11/2006 | Timmons .......... G06F 17/30979 |
| 2007/0277183 A1 | 11/2007 | Muramatsu et al. |
| 2008/0016176 A1* | 1/2008 | Leitner .................. A63F 13/10 709/217 |
| 2008/0040490 A1 | 2/2008 | Karlberg |

(Continued)

*Primary Examiner* — Chameli Das
(74) *Attorney, Agent, or Firm* — The Law Office of Joseph L. Felber

(57) ABSTRACT

Automatic submission of a specific application to an application store. An executable of a parent application when executed with a parameter, is configured to provide the functionality of the specific application. The automatic submission method comprises generating an identifier for the specific application in an application store. The identifier is provided to a server of the application store to generate a certificate. For each target screen size defined by the application store, execution of the specific application is simulated while having a display size set to the target screen size, wherein during said simulating, storing a plurality of screenshots of the specific application. The specific application is automatically submitted to the application store using the certificate, wherein said submitting comprises uploading at least a portion the plurality of screenshots.

12 Claims, 7 Drawing Sheets

(56) References Cited

U.S. PATENT DOCUMENTS

| | | |
|---|---|---|
| 2010/0233996 A1 | 9/2010 | Herz et al. |
| 2010/0292556 A1* | 11/2010 | Golden ................ A61B 5/7465 600/364 |
| 2011/0161912 A1 | 6/2011 | Eteminan et al. |
| 2012/0244952 A1 | 9/2012 | Patil |
| 2012/0254853 A1 | 10/2012 | Aggarwal et al. |
| 2013/0132854 A1 | 5/2013 | Raleigh et al. |
| 2013/0132941 A1 | 5/2013 | Lindeman et al. |
| 2014/0032210 A1* | 1/2014 | Baker ................ G06F 3/04886 704/10 |
| 2014/0130035 A1* | 5/2014 | Desai ..................... G06Q 20/08 717/172 |
| 2014/0164256 A1 | 6/2014 | Booij et al. |
| 2014/0321634 A1 | 10/2014 | Baranovsky et al. |

\* cited by examiner

AUTOMATIC SUBMISSION OF APPLICATIONS TO APPLICATIONS STORES

CROSS-REFERENCE TO RELATED APPLICATIONS

This application is a continuation in part of and claims the benefit of U.S. non-provisional application Ser. No. 14/926,010 filed Oct. 29, 2015, entitled METHOD AND APPARATUS FOR DEVELOPING, DISTRIBUTING AND EXECUTING APPLICATIONS, which is a continuation of U.S. non-provisional application Ser. No. 13/751,551 filed Jan. 28, 2013, entitled METHOD AND APPARATUS FOR DEVELOPING, DISTRIBUTING AND EXECUTING APPLICATIONS, now U.S. Pat. No. 9,176,726, all of which are hereby incorporated by reference in their entirety for all purposes and without giving rise to disavowment.

TECHNICAL FIELD

The present disclosure relates to applications for mobile devices in general, and to automatic submissions of applications to application stores, in particular.

BACKGROUND

In recent decades and particularly in recent years, electronic technology, including communication technology, has revolutionized our everyday lives. Portable electronic devices such as mobile phones, tablet computers, Personal Digital Assistants (PDAs), or the like, have permeated the lives of almost every person living in the developed world, and quite a number of people living in undeveloped countries. Mobile communication and computing devices, especially, have become the means by which countless millions conduct their personal, social, cultural, and professional interactions with the world. As part of this trend, a tremendous number of applications for mobile devices are developed, downloaded, and used by millions of people on a daily basis.

A typical application comprises a User Interface (UI) enabling a user to operate the application, for example enter data, receive results, or the like, a database for storing data related to the application, and one or more business logic modules (also referred to as "logic") for operating on the data in accordance with the user's instructions, including retrieving, modifying, storing, or deleting data.

In older architectures, sometimes referred to as "first generation", an application executed by a mobile device was a stand-alone application, in which all components, including the UI, logic and database were local and compatible with the device and its operating system. In such architectures, the application was not and did not have to be in any type of communication with a server platform during execution.

In some exemplary embodiments, while the application itself may be fully stored on and executed by the mobile device, it may contact an external source such as a server for obtaining updated data, such as weather data, stock quotes, or the like.

In more modern architectures, sometimes referred to as "generation 1.5", the UI components resided on and were compatible with the mobile device, but the database and often also the business logic were provided by a web server, such that the application had to be in ongoing communication with the server for proper operation. In these architectures, the application communicated with a predetermined server, and proprietary data types may have been exchanged between the mobile device and the server.

In more modern architectures, supported for example by current "application stores", sometimes referred to as "second generation", the UI is still executed by the mobile device and the logic and database reside on a web server, but a single server can serve a multiplicity of UI types, each compatible with a mobile device or type of an operating system. This is similar to the classic web-based service architecture, wherein the main difference between the "second generation" and the "generation 1.5" architectures is that in the "second generation" each server can serve a multiplicity of different applications.

In all the above-mentioned architectures, the process of developing, distributing and executing applications suffers from three main problematic areas: developing the application, which requires design and programming stages; marketing and distributing the application; and updating the application and providing users with new versions without bothering the user.

Current solutions comprise application generation tools or environments, and continue by directing the developers to application stores or markets such as APPLE APPSTORE™ and GOOLGE PLAY™ for distributing the application.

BRIEF SUMMARY

One exemplary embodiment of the disclosed subject matter is a method for automatic submission of a specific application to an application store, wherein the specific application is configured to be executed by executing an executable of a parent application with a parameter associated with the specific application, wherein the parent application is configured, when being executed by a mobile device with the parameter, to retrieve, using the parameter, from a local database in the mobile device a configuration of the specific application, wherein the configuration describes for the parent application a manner to provide the functionality of the specific application through a use of at least one module, wherein the parent application is configured to activate the at least one module to provide the functionality of the specific application by the parent application, whereby the functionality of the specific application is provided by the executable of the parent application and without using a separate executable for the specific application, the method comprising: generating an identifier for the specific application in an application store; providing the identifier to a server of the application store to generate a certificate; for each target screen size defined by the application store, simulating execution of the specific application while having a display size set to the target screen size, wherein during said simulating, storing a plurality of screenshots of the specific application; and automatically submitting the specific application to the application store using the certificate, wherein said submitting comprises uploading at least a portion the plurality of screenshots.

Optionally, the method further comprises: automatically determining a score for each screenshot of the plurality of screenshot with respect to each target screen size;

for each target screen size, selecting a subset of the plurality of screenshots based on the scores; and wherein said uploading comprises uploading the subset of plurality of screenshots, whereby screenshots are selected based on a score-based selection criteria to represent the specific application in the application store.

Optionally, the method is performed a plurality of times, each time with respect to a different application store.

Optionally, the method further comprises: modifying the code of the parent application to mimic providing the parameter when executing the parent application; compiling the modified code using the certificate; and wherein said simulating comprises simulating execution of the compiled modified code.

Optionally, the at least one module is selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customers module; a meeting scheduler module; a team management module; a meeting scheduler module; a sharing module; a bump module; a forum module; a customer reviews module; a push notification module; and a shopping module.

Additionally or alternatively, the method may be performed by an apparatus configured to perform such method. Additionally or alternatively, a computer program product may comprise program instructions, which instructions, when ready by a processor, cause the processor to perform such method.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
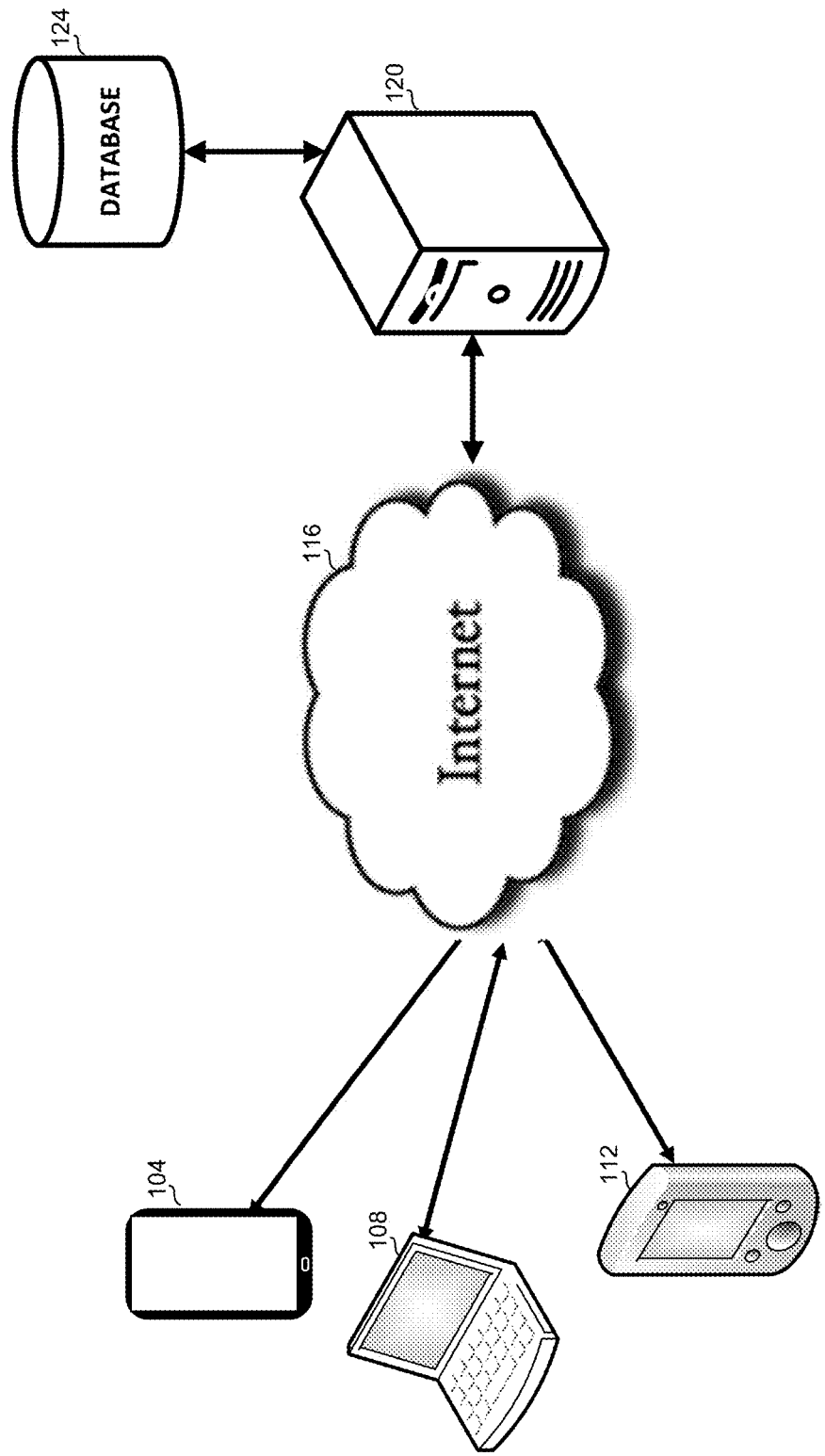
FIG. 1A is a schematic illustration of a prior art configuration of client-server environment.

One technical problem dealt with by the disclosed subject matter is the need for executing applications by a device such as a mobile device, whether the device is online or offline. In current technologies, if one or more of the required parts of the application, including but not limited to the user interface, the logic and the database in which the information is stored are not available on the device, then the application cannot be executed without communication with another device or server, such as a web server.

On the other hand, having all parts of an application available on the mobile device, may cause another technical problem which is dealt with by the disclosed subject matter: the need to update applications, as new versions become available. In current technologies, updated versions may or may not be suggested to a user by the application store, and even if an update is pushed to the mobile device, the user has to take the time and attention to download the updated application and install it, even for minor or almost meaningless changes.

Yet another technical problem dealt with by the disclosed subject matter relates to the need for fast development of applications. Development should use a set of predetermined tools, which are easy to use and manipulate on one hand, but provide flexibility on the other hand, to provide desired functionality and appearance.

Yet another technical problem dealt with by the disclosed subject matter relates to automatic submission of applications to application stores. Application stores are used to distribute applications to users. Submission of the application may be a manual task that may be a hurdle in the process of distributing the application to users. Elivating such a hurdle may be desired. Furthermore, each application store may have different requirements which may complicate the manual process even further.

One technical solution comprises a parent application which may be downloaded to and installed on a mobile device, and may attempt to communicate with a server when started. The application may provide a user with specific applications registered with the parent application. The parent application may display all registered specific applications, may provide classification of the registered specific applications, may provide searching capabilities within the registered specific applications, or the like.

Each such specific application may use during execution one or more modules, including but not limited to one or more User Interface Modules (UIMs), one or more Business Logic Modules (BLMs), modules related to a specific domain, or other modules, which may be provided, for example by a developer or a supplier of the parent application. The UIMs may contain, for example an HTML display module, a list display module, a table display module, a carousel display module, or others. The BLMs may include data processing modules, trade-related modules, social-network related modules, or others, for example as detailed below. In some embodiments, the specific application may contain no designated program code, but may rather be configured to use one or more of the UIMs or BLMs.

It may be that a BLM may influence one or more UIMs, for example when displaying data, or vice versa, for example in response to the user's activities. As an example, consider a UI module displaying a set of images in a graphical manner. The UI module may be activated using API to rotate, enlarge or otherwise. One BLM may be configured to manipulate the UI module in a certain manner (e.g., rotating all images as they are introduced) while another BLM may manipulate the UI, using the API, in a different manner.

In some exemplary embodiments, a specific application may contain general purpose code operative to execute modules based on configuration information, which may be retained in a configuration file, in a database, or the like.

It will be appreciated that any specific application may use any one or more modules, and may configure any of the modules in a specific manner. For example, a carousel display module that displays items in a carousel user-interface, may be configured by one application to display five (5) items, and by another application to display twenty (20) items, and the location from which the items to be displayed may also be indicated as a configurable parameter. Other examples may include configurable color, the content of the carousel, an icon which may be used to activate the module, or the like.

The provided modules may include but are not limited to modules such as the following:

an "about" module providing details about an entity, for example in the format of an electronic business card;

a menu module which may be useful in a restaurant or bar application;

a products and services module, which may be useful in displaying an electronic brochure or enabling window shopping;

a gallery module, which may be useful in displaying portfolios;

an events module, which may be useful in implementing event planner and scheduler as part of an application;

a calendar module, which may be useful in implementing calendar features as part of an application;

a chat module, which may be useful in implementing chats as part of an application;

a video chat module, which may be useful in implementing video chats as part of an application;

a sales and promotions module, which may be useful in featuring sales as part of an application;

an orders and delivery module, which may be useful in mailing items purchased through an application;

an order progress bar module, which may be useful in displaying the progress of an order made through an application;

a video gallery module, which may comprise video clips and enable operations such as playing, editing, sharing the clips, or the like;

a music gallery module, which may comprise audio clips and be useful in in many types of applications;

a friends module, which may be useful in managing contacts in many types of applications;

a delivery guide module, which may be useful in providing maps and instructions and may be useful in managing deliveries as part of commercial applications;

a customers module, which may be useful in managing customers in a wide variety of applications;

a meeting scheduler module, which may be useful in arranging meeting between two or more people, and may be used in a wide variety of applications;

a team management module, which may be useful in managing players, representatives, or the like, and may be used in applications such as sports or other hobby-related applications;

a sharing module for sharing information with another user, or with friends in a social network, and may be used in a wide variety of applications;

a bump module for transferring a specific application to a mobile device that touches another mobile device that has this application installed;

a forum module for providing a forum functionality to an application;

a customer reviews module for enabling customers to express recommend, rank or otherwise state their opinion about a product;

a push notification module for implementing message playing by the mobile device; and a shopping module which may be used for bank clearing or other payment mechanism, which may be used in a variety of applications.

It will be appreciated that the above module list is exemplary only and any other collection of modules may be used.

When the parent application is installed on a user mobile device, it may copy to the device the available modules, and establish on the device a database which will later, after one or more specific applications are installed, indications for each specific application installed on the device which modules it uses, for example which UIMs and BLMs it uses.

When a user using the parent application selects a specific application, information about the modules required for the specific application may be downloaded to the database established by the parent application which is stored on the mobile device. In some embodiments, during installation of the specific application, the modules used by the specific application may be verified to be present on the mobile device, or may be downloaded otherwise.

Additionally, data files associated with the specific application may be copied to the device during installation. The data files may be accessed by any of the modules. In addition, configurations associated with the specific application for one or more modules may be downloaded and may be stored in the database, as files, or in any other manner.

It will be appreciated that the term "installation" for the specific application may be different than its common meaning, since in some embodiments no code or executable is copied to the mobile device. Rather, a database is updated with information related to the usage the specific application does with the modules, data files may be copies, and configurations may be stored. Additionally or alternatively, the specific application may be installed by copying the executable of the parent application to the device and updating information useful for executing the executable of the parent application in a manner which provides the functionality of the specific application.

Once the database is updated and all data files are available, the specific application may be executed on the user's mobile device in a stand-alone manner, similar to a first generation application, e.g., wherein the application's user interface, logic and database are all stored on the mobile device and no communication with an external server is required.

In some exemplary embodiments, when the user starts any of the specific applications for example by clicking on its icon, it may be the parent application, or a thread of the parent application that is being executed, optionally with a parameter associated with the specific application, for example a numeric or other identifier associated with the specific application.

When the parent application gains access to its server, it may update the mobile device database. The database may be updated with information indicating which modules (UIM and/or BLM) are used by the specific application. In some exemplary embodiments, the database may be updated with configuration information relating to each module, to the manner in which the modules are connected to one another (e.g., operating module X by interacting with module Y), or the like. In some exemplary embodiments, the database may be updated with respect to the specific application only or to all specific applications installed on the mobile device.

In some exemplary embodiments, additional files may be updated from the server, such as but not limited to files used by the modules in the operation of the specific application, as defined by its configuration. Additionally or alternatively, UIMs or BLMs may be updated if newer versions are available and optionally new available UIMs or BLMs may be downloaded to the mobile device.

Thus, the specific applications are being updated automatically without the user having to download and install an update for each specific application.

Another technical solution is to perform an automatic process for each application store to which the application is to be uploaded. In some exemplary embodiments, an identifier is generated to identify the specific application in the application store. Using the identifier, certificates useful for the submission process may be generated. The certificates may be generated by servers of the application store.

Submission of an application to a store may require providing several screenshots of the application, at different screen sizes, as defined by the application store (e.g., portrait/landscape display of smartphone/tablet/mini-tablet). A simulator may be used to simulate execution of the application while having different display sizes. During each such simulation, several screenshots may be captured. In some exemplary embodiments, an automatic scoring mechanism may be used to automatically set a score for each screenshot. For each screen size, the top screenshots may be selected based on the scores and used in submission. For example, in case the application store requires five screenshots, the five screenshots having the highest scores may be selected automatically.

In some exemplary embodiments, the application submitted to the application store may be required to be complied using the certificate generated by the application store. An executable of the specific application may be created by modifying the code of the parent application to include a hardcoded statement setting the value of the parameter used to identify the specific application to be the value of the specific application being uploaded. For example, assuming the value is an identifier of the specific application (e.g., identifier that may be different than the identifier in the application store). As an example, for application having identifier 43262, instead of executing the parent application with the argument 43262, the code may be modified to include the statement: ARGV[0]="43262", setting, in a hard code manner, the first argument to always have the value 43262. The modified code may be compiled to generate an executable to be submitted to the application store.

One technical effect of the disclosed subject matter is the option to execute applications by a device such as a mobile device, in the same manner whether the device is connected to the network or not. All required parts of the specific application are stored on the mobile device, and no communication with a server is required for operating the specific application.

Having all the modules required for an application on the mobile device enables all processing to be performed by the mobile device, and provides for hybrid operation of the application as it is executed on a mobile device with or without communication to a remote device.

Another technical effect of the disclosed subject matter is the automatic updating of applications without the application vendor having to push the data to the mobile device, and the user having to download and install the application.

Yet another technical effect of the disclosed subject matter is the relatively little effort required for developing new applications. Having relevant UIMs and BLMs, a new application may be developed almost effortlessly where only data and configurations have to be supplied. For example, if modules exist which provide solution for a multiplicity of applications associated with different restaurants, developing an application for yet another restaurant may be done with little effort.

Referring now to FIG. 1A, showing an exemplary prior art environment for downloading and executing applications.

The environment may comprise one or more mobile devices such as mobile phone 104, laptop computer 108 or Personal Digital Assistant 112, each connected to the Internet 116 by any wired or wireless connection. Each mobile device has downloaded thereto an application, such that only a small part of the application, for example the user interface is present and executed on the mobile device. The functionality of the application may be provided by a server-side application executed by server 120, optionally communicating with database 124 storing and retrieving information related to the application.

Thus, in prior art systems, the application can only function when there is live connection between mobile device and the server through the Internet. Even further, whenever there is a change in any of the application parts installed on the mobile device, these parts have to be downloaded and installed on the device.

Figure 1B:
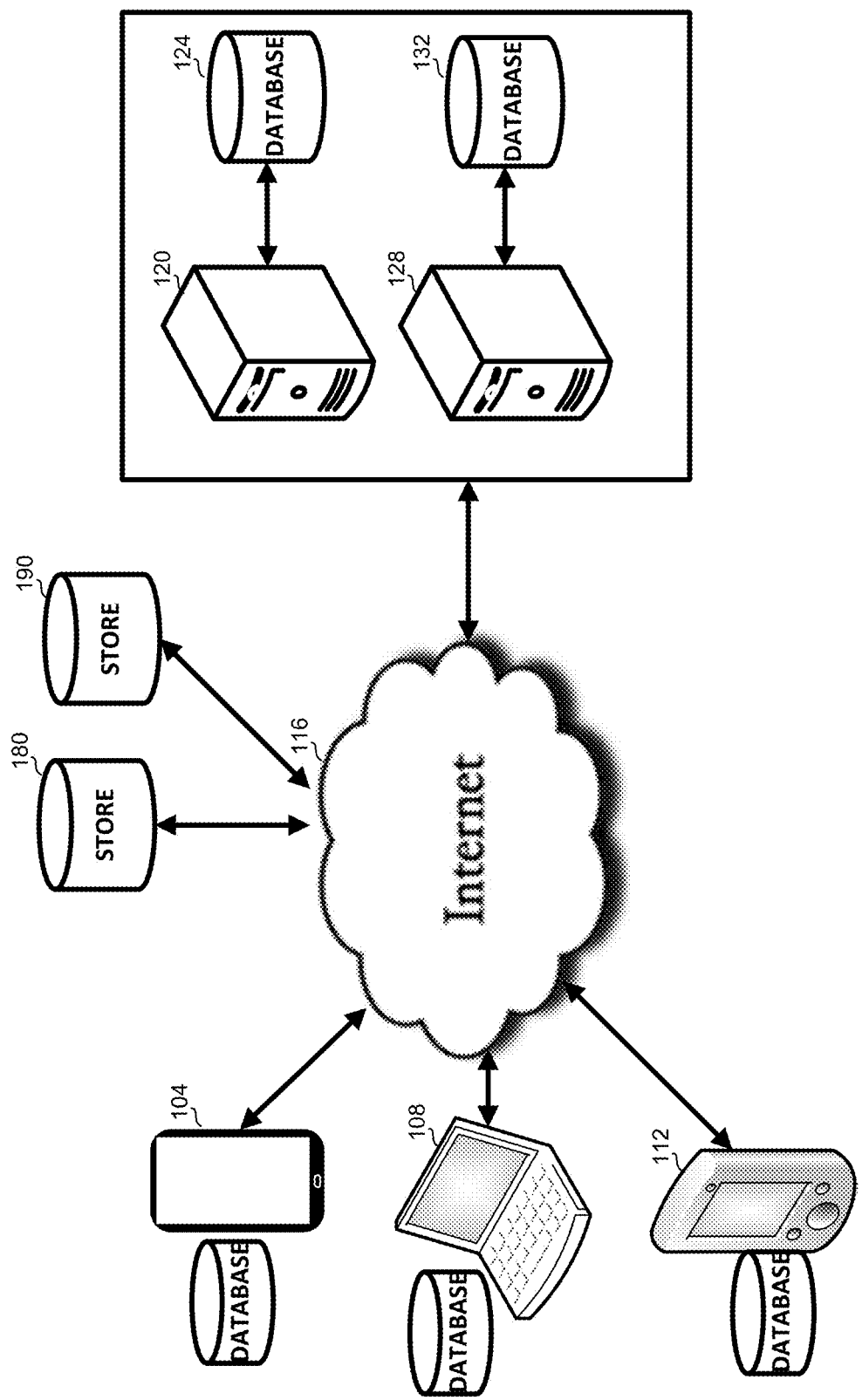
FIG. 1B is a schematic illustration of a configuration for distributing, executing and updating applications, in accordance with some exemplary embodiments of the disclosed subject matter.

Referring now to FIG. 1B, showing an exemplary environment for downloading and executing applications, in accordance with the disclosure.

The environment may comprise any one or more mobile devices such as mobile phone 104, laptop computer 108 or Personal Digital Assistant 112 disclosed in association with FIG. 1A above. Each such mobile device has installed thereon a parent application which may be used as a gateway for multiple specific applications. The parent application may provide for selecting specific applications, downloading all their relevant parts, and execution without requiring communication to a server. For executing the specific applications, each mobile device may comprise thereon the module collection and a database indicating which modules are required for each specific application, and optionally data files or configurations.

The parent application may communicate via a communication channel such as the Internet 116 with one or more servers such as servers 120 or 128, each optionally associated with a database such as 124 or 132, which may contain the data and configurations for one or more specific applications.

Thus, the parent application as installed on a mobile device may communicate with the servers in order to retrieve information about the modules required for a specific application, or retrieve the modules if a new version is available.

In some exemplary embodiments, as application stores, such as Store 180 and Store 190, may be deployed as part of the environment. Store 180 may be a repository of applications that is used to distribute applications to user device. Each store may be administered by a different entity, such as GOOGLE™ for GOOGLE PLAY™ or APPLE™ for APPSTORE™. A Developer wishing to submit an application to Store 180 may be required to do so using a certificate issued by Store 180. The certificate may be used to ensure that the developer is the one uploading the application and any updates thereto. The certificate may be used to ensure that the application was compiled by the developer himself and not by a third-party. In some exemplary embodiments, certificate may be used to keep track on licensing information so as to ensure that the compiled code was compiled with a licensed compiler. After an application is submitted to Store 180 it may be downloaded therefrom to user devices that contact Store 180.

Figure 2A:
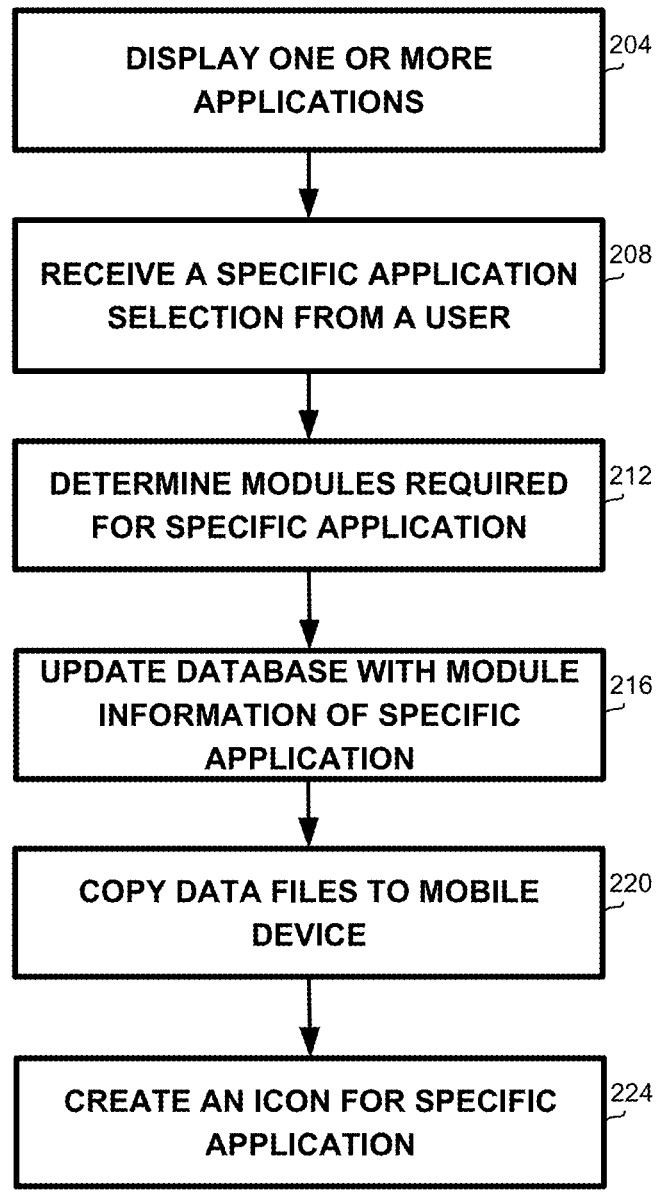
FIG. 2A is a flowchart diagram of a method for providing and installing applications, in accordance with some exemplary embodiments of the disclosed subject matter.

Referring now to FIG. 2A, showing a flowchart of steps in a method for providing and installing applications.

As a preliminary step, a parent application may be downloaded to a mobile device and installed thereon, similar to the installation of any application. The parent application may be a web-based application which communicates with a web server providing the information.

Installation of the parent application on the mobile device may comprise installing an executable file of the parent application on the mobile device, and establishing a local database on the mobile device, which may later indicate for each specific application the required modules. Installation may also comprise copying the most updated versions of each of the available modules to the mobile device.

On step 204, when the parent application starts, it may display to a user a list of specific applications as received from a server. The specific applications may be displayed as a hierarchy, categorized according to subjects, searchable, or in any other manner. The specific applications are applications which may be executed using BLMs and UIMs of the parent application.

On step 208, a selection of one or more specific applications may be received from a user.

On step 212, the parent application may determine, based for example on a remote database, which BLMs and UIMs are required for the specific application or applications selected by the user.

On step 216, the parent application may update the local database with the information related to the modules required for each of the specific application. For each module a set comprising one or more configuration parameters may be associated with the specific application, and may be stored within the database or on a separate storage.

On step 220, data files related to the specific application may be provided to the device, including for example pictures, HTML pages, text files, video files, audio files, or the like, which may be used by the modules such as the UIMs and BLMs for manipulating data associated with the specific application.

On step 224 an activation shortcut such as an icon may be created for the specific applications. In some embodiments, each such activation shortcut may be associated with a parameter such as a numeric or textual parameter. When the user activates the specific application, it may be the parent application that starts, wherein the parameter associated with the specific application being used as an argument for the parent application. Thus, icons of two or more specific applications may point to the same application, being the parent application, but with different arguments. However, it will be appreciated that the graphic icon of each such specific application may be unique and may differ from the graphic icon of the parent application, and may reflect or be associated with the specific application.

Figure 2B:
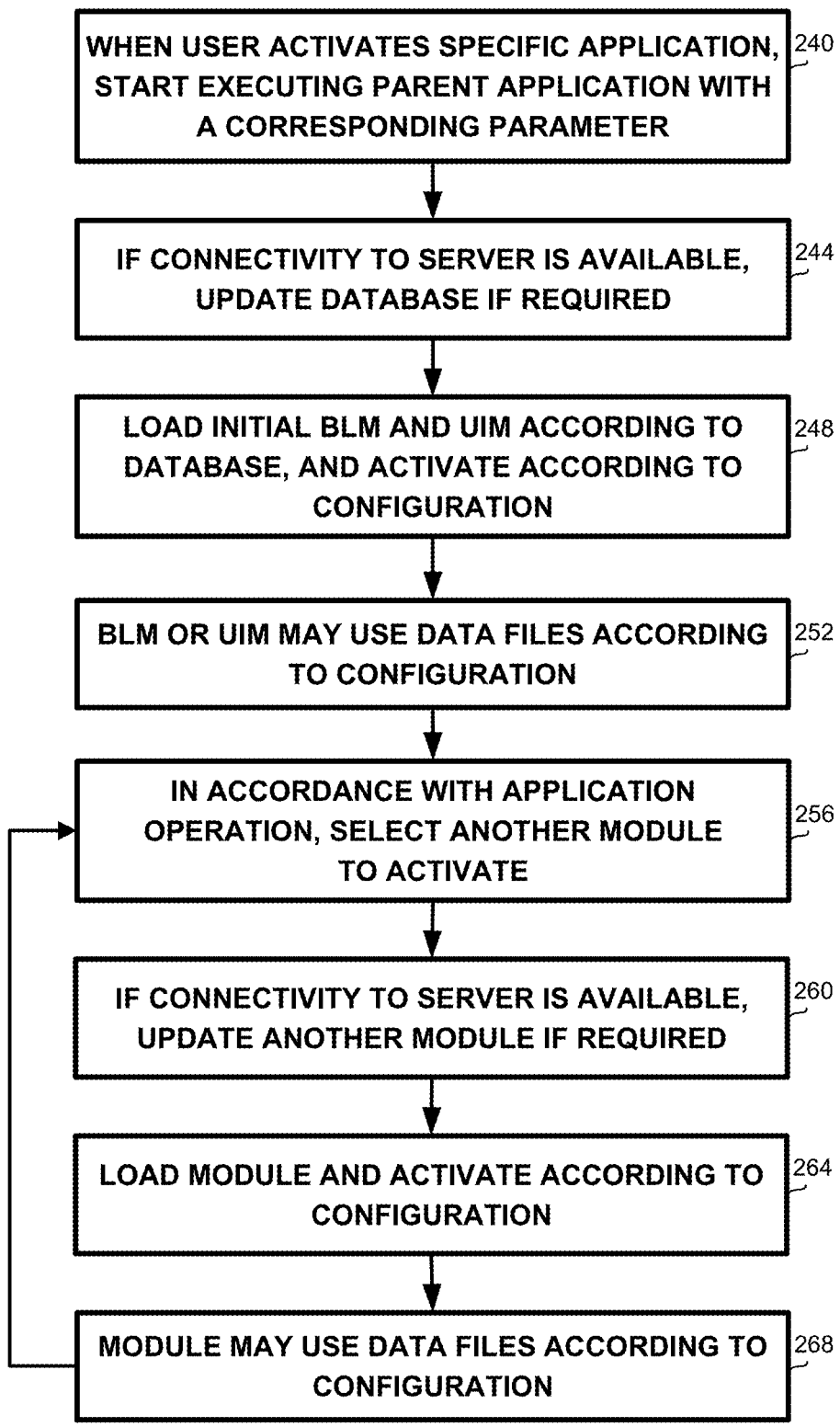
FIG. 2B is a flowchart diagram of a method for executing applications, in accordance with some exemplary embodiments of the disclosed subject matter.

Referring now to FIG. 2B, showing a flowchart of steps in a method for executing applications.

On step 240, responsive to the user activating a specific application, for example by selecting an icon associated with the specific application, the parent application is started with the corresponding parameter, associated with the specific application.

On step 244, the parent application may determine whether the mobile device has connectivity to the server. If it has, then the parent application may check whether there is an update to the specific application, for example a change in the collection of modules indicated as used by the specific application, and if there is such change, it may update the database. It may also check whether any of the used modules have changed, e.g., a newer version is available, and may update the version stored on the mobile device. The parent application may also update, if required, any of the data files associated with the specific application. In some exemplary embodiments, only the modules which are initially loaded for the specific applications and their associated data files may be updated.

On step 248, the parent application may retrieve from the database the specific BLM or UIM to be loaded for the specific application, and may load them into memory. The parent application may then activate any of the modules in accordance with the specific configurations as indicated for the specific application, for example in the database.

On step 256, in accordance with the operation of the specific application, for example responsive to actions by a user, a further module, such as another BLM or UIM may be selected to be activated. For example, in an electronic trade application, after a user selected an item and asked to proceed to checkout, a payment module may be selected.

On step 260, if the mobile device has connectivity to the server, the parent application may check whether an update exists for any of the new modules to be loaded or any of their associated data files and configurations, and may update them if required. Step 260 may enable updating the specific application on-the-fly even when Step 244 failed to update the database, such as in view of not having connectivity. In some exemplary embodiments, Step 260 may perform similar updates to those of Step 244 and not be limited to update only the new modules and theirs associated files and configurations.

On step 264 the new module may be loaded and activated in accordance with the specific configuration as may be obtained from the database.

On step 268 the new module may load data from an associated data file. The module may operate based on the configuration as appearing in the database.

Execution may then go back to step 256 and continue, where new modules may be selected and activated, for example in accordance with the user's activities.

Figure 3:
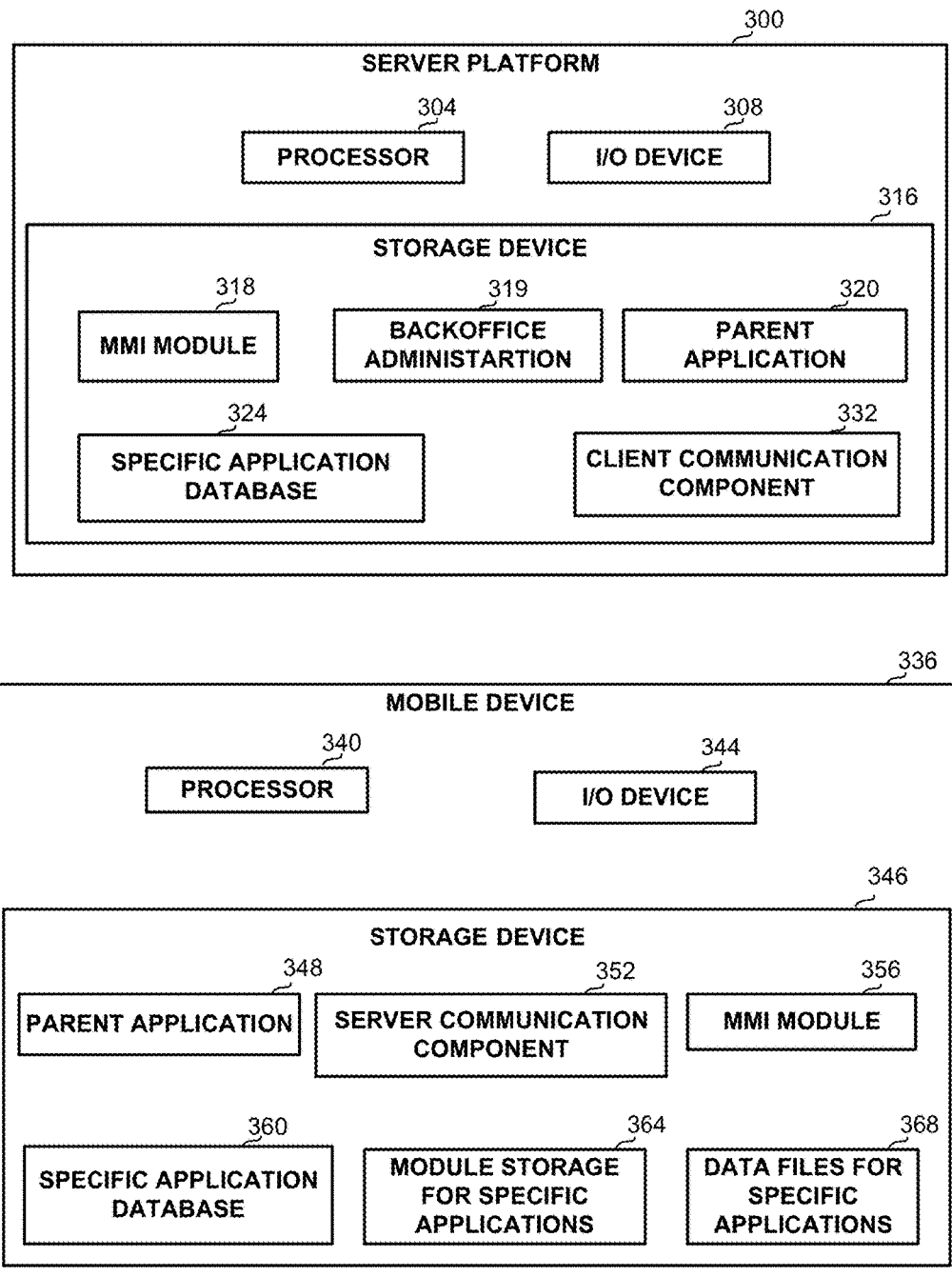
FIG. 3 shows a block diagram of an apparatus for providing and executing applications, in accordance with some exemplary embodiments of the disclosed subject matter.

Referring now to FIG. 3, showing a block diagram of a system for providing and executing applications.

The apparatus includes a server platform 300 which communicates with one or more mobile devices 336. Server platform 300 may represent any of the servers shown in FIG. 1B, such as server 120 or server 128.

In some exemplary embodiments, server 300 may comprise a processor 304. Processor 304 may be a Central Processing Unit (CPU), a microprocessor, an electronic circuit, an Integrated Circuit (IC) or the like. Alternatively, processor 304 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

Server 300 may further comprise I/O device 308 such as a display, a keyboard, a touch sensor, a mouse, an audio device, or the like, for a user to interact with the server device, generate events, provide commands, or the like.

In some exemplary embodiments, server 300 may comprise one or more storage devices such as storage device 316, for storing for example data related to applications, details related to one or more client devices or users, or the like. Storage device 316 may be persistent or volatile. For example, storage device 510 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

Storage device 316 may store or be loaded with a man-machine interface (MMI) module 318 which may be used by a user to provide input to the system or to receive output from the system via any of I/O devices 308. For example, MMI module 318 may be used for adding, deleting or changing information about specific applications to the server. It will be appreciated that in some embodiments, server 300 may be implemented without MMI module 318.

Storage device 316 may comprise backoffice administration component 319 for managing the configurations of specific applications, users, or the like. For example, backoffice administration component 319 may provide for monitoring the number of downloads of a specific application, billing, or the like.

Storage device 316 may store or be loaded with parent application 320, which is the application to be downloaded to the mobile devices.

Storage device 316 may store specific application database 324 comprising details relevant to each specific application, including for example identifying details, billing details, icon, or the like. In addition, specific application database 324 may also store for each specific application, indications such as identifiers of the UIMs and BLMs required by the application. Each new specific application registered with the parent application provides indications for the UIMs and BLMs it requires, and these indications are stored in database 324. Database 324 may further comprise configuration parameters or variables required for each module, or information related to interrelations between the modules in the context of the specific application, for example the parameters with which a particular module activates or calls another module.

Storage device 316 may comprise module storage 326, for storing the various the UIMs and BLMs required by any one or more of the applications.

Storage device 316 may store or be loaded with client communication component 332 for establishing communication with a mobile device for downloading the parent application, receiving requests for specific applications from the mobile devices, providing the modules, or the like. In some exemplary client communication component 332 may provide for checking whether the specific application database on a mobile device or any of the modules thereon needs updating, and may take care of the update.

Mobile device 336 may be any computing platform which may be carried by a user in the environment, such as a mobile phone, a smart phone, a tablet computer, a laptop computer, a Personal Digital Assistant, or the like.

Similarly to Server platform 300, mobile device 336 may comprise a processor 340, I/O device 344 and storage device 346 as described above in association with processor 304, I/O device 308 and storage device 316.

It will be appreciated that in addition to the components detailed below, client platform 136 may comprise all components relevant for its regular functionality, such as cellular communication system, Wi-Fi communication system, operating system, applications, or the like.

Storage device 346 may comprise or be loaded with parent application 348 downloaded from server 300 and installed on the mobile device.

Storage device 346 may comprise server communication component 352 for communicating with server platform 300, for example for establishing communication with server platform 300, receiving information about the modules required for a specific application, receiving database updates, module updates, data files updates, or the like.

Storage device 346 may comprise an MMI module 356 for receiving input from a user or providing output to the user, for example showing to the user a list of the available applications. MMI module 356 may also be adapted to be used when executing any of the specific applications, by using one or more of the UIMs required by the application.

Storage device 346 may have stored thereon specific application database 360 which may comprise information about the modules required for each of the specific applications installed on the device. Database 360 may be updated by parent application 348 when the mobile device is connected to the internet.

In addition, storage device 346 may contain module storage for specific applications 364, which contains the UIMs, BLMs or other modules as provided during installation of the parent application. In some exemplary embodiments, the modules may be implemented or stored as part of parent application 348.

Storage device 346 may further comprise data files for specific applications 368, such as image files, text files, HTML pages, or the like, or specific configurations for the modules.

In some exemplary embodiments, the parent application may be adapted to be executed by different operating systems, such as iOS™, Android™ or others, thus providing a uniform infrastructure for generating applications for different devices.

Figure 4:
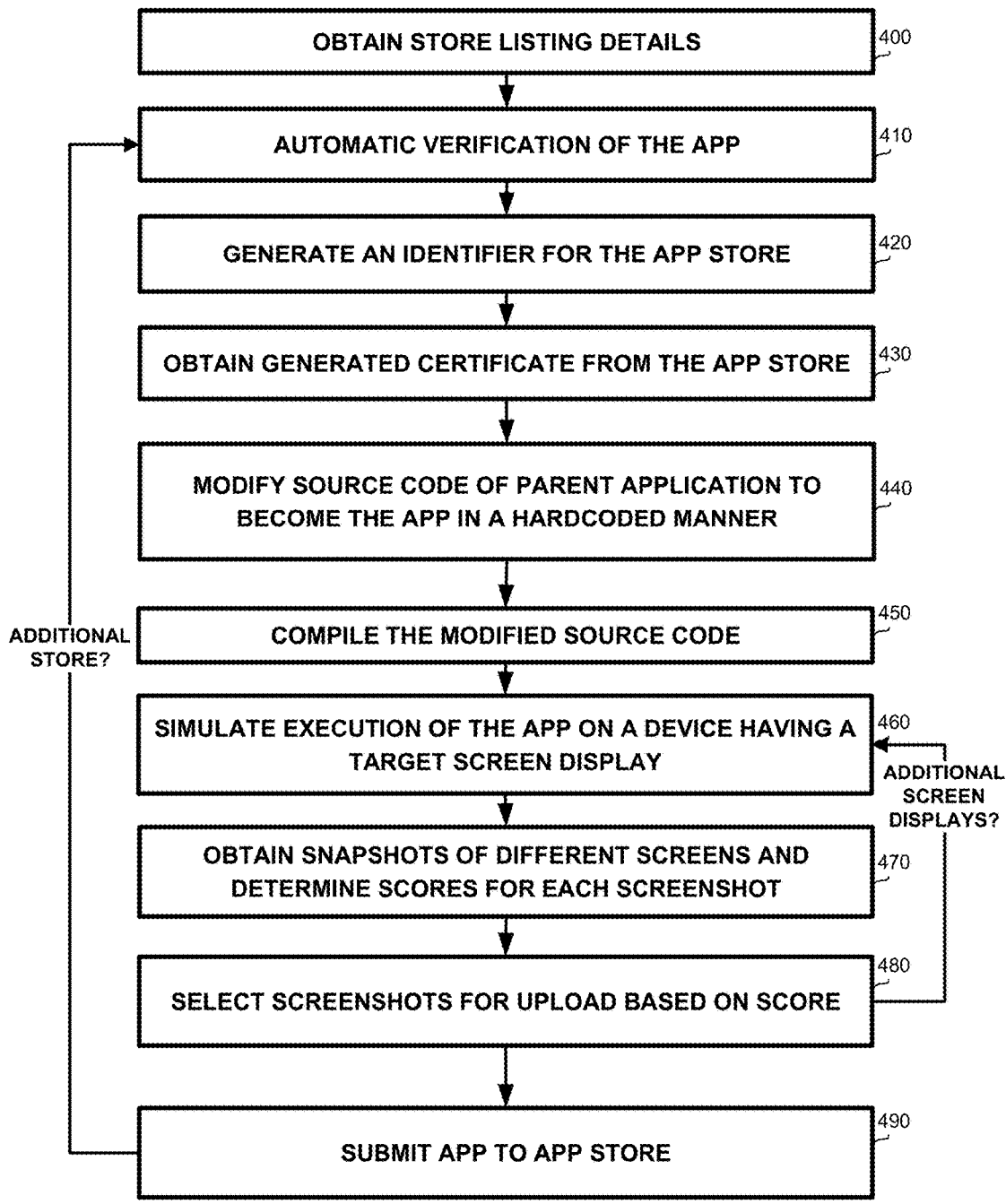
FIG. 4 shows a flowchart diagram of a method of automatic submission of applications to an application store, in accordance with the disclosed subject matter.

Referring now to FIG. 4, showing a flowchart of steps in a method for executing applications.

On Step 400, store listing details may be obtained. The store listing details may include title of the application, description, price and similar information regarding the application that may be used when submitting the application to the application store. In some exemplary embodiments, the owner of the specific application (hereinbelow, candidate application, application or app) may be presented with a submission form that is unified for all application stores. The submission form may include fields that may be used to provide information to different application stores (e.g., a unified title field may be used to define a title in all application stores). Additionally or alternatively, some fields may be unique for a specific application store. For example, there may be a field that is only relevant to a certain application store and is used exclusively for such purpose. Additionally or alternatively, specific fields may be used to provide different information to different stores. For example, a unified title field may be used to define a title for all application stores. However, if a user fills an APPSTORE™ title field, the content of such specific title field may be used instead of the content of the unified title field when submitting the application to APPSTORE™.

On Step 410, automatic verification of the application may be performed. The automatic verification may be an automatic procedure in which the candidate application is scanned for content and structure to verify compliance with the requirements and guidelines of the application stores to which the candidate application is to be submitted. In some exemplary embodiments, the verification may be based on previous knowledge and experience such as automatic rejects received in previous attempts to submit other applications which may be used to automatically define restriction rules to be applied during such verification process.

In some exemplary embodiments and as an example only, uncompleted/empty screens may be identified, absence of user-value screens such as customers club, chat etc., may be identified during the verification process. In some cases, verification may be performed in a later phase, such as after generation and selection of screenshots.

In some exemplary embodiments, a status indicator for the application may be retained for each application store. The status indicator may be indicative of the submission status. As an example, the status may be pre-submission (e.g., application in work), submitted (e.g., the application was submitted to the store and is pending review and approval by the application store), approved (e.g., the application is live on the application store and is available for downloaded therefrom), rejected for content (e.g., the app was rejected for content reasons), rejected for technical issue (the app was rejected for bugs; the bugs may have been caused by the developer of the parent application and not the developer of the specific application which may not edit any code and only provide business logic rule and similar definitions). In some exemplary embodiments, the disclosed subject matter may update the status and update it upon an event causing it to change. Notifications, such as via e-mail or push notifications, may be transmitted to the developer of the specific application whenever a status is changed. In some exemplary embodiments, a status of rejected for technical issue may be also notified to a developer of the parent application for review.

In some exemplary embodiments, each step beginning in Step 410 may be performed per application store. For example, Step 410 may be performed independently for checking compliance to APPSTORE™, to AMAZON STORE™ and to GOOGLE PLAY™.

On Step 420, an identifier for the application is generated. The identifier may be an identifier of the application in a specific application store and for each application store a different identifier may be generated. In some exemplary embodiments, a system performing the method of FIG. 4 may create external identifiers for each application store to which the application may be submitted. Each identifier may be used to be able to track and manage the submitted app in each store through the entire life cycle (e.g., throughout the submission process and also for uploading updates after the initial submission).

In some exemplary embodiments, a submission manager may be used to process in a batch manner several applications that are to be submitted to the same application store, such as by performing Steps 430-450 per each application.

On Step 430, a submission manager may connect to the certificate server of the application store and create an instance of the candidate application on such server, using the identifier of Step 420. The certificate server may generate a certificate accordingly and such certificate may be obtained by the submission manager. In some exemplary embodiments, the certificate may be any or all of the below: development Certificated for the app; distribution Certificated for the app; development Provisioning Profile for the app; ad hoc provisioning profile for the app; distribution provisioning profile (e.g., allowing secured submission to the app store); development push notification certificate; production push notification certificate; or the like. In some exemplary embodiments, some certificates, such as development provisioning profile and ad hoc provisioning profile may also include internal test devices used by the submission manager and the developer of the parent application. Such certificates may therefore allow provisioning during development mode and in ad hoc situations by the submission manager on behalf of the developer of the parent application.

In some exemplary embodiments, push notification certificates may be transmitted to a server, such as Server 300, to be stored and used to generate and send push notifications on behalf of the app.

On Step 440, a source code of the parent application may be modified. The code to be modified may be the last version of the parent application released for the relevant store/platform. The code may be modified so as to execute the specific application always without relying on being executed and receiving the identifier of the application as an execution argument. The code may be modified to include a hard-coded setting of the identifier's value. In some exemplary embodiments, code changes may include source code changes, changes to project structure and dependencies, assets (e.g., images) preparations according to the requirements of the application store, or the like.

In some exemplary embodiments, certificates and provisioning profiles may be embedded into the app. In some exemplary embodiments, the certificates may be embedded in the source code of the parent application so as to allow compilation of the source code (Step 450). In addition the code may be altered in order to adapt the push notification management inside the app to push notification certificates generated on Step 430.

On Step 450, the modified code may be compiled. The compilation may be performed using the certificate obtained on Step 430, such as using the development certificate. In some exemplary embodiments, once compiled, the app may be archived into an executable package file which can be executed.

On Step 460, the app may be executed by a simulator simulating execution thereof. The simulator may be adapted to provide a simulation of the app in a device having a target screen display, such as a specific resolution, screen size, aspect ratio, number of pixels, or the like. The target screen display may be provided as an input to the simulator and different screen displays may be used. During simulated execution of the app, automatic input may be provided to the app so as to iterate over different screens of the app and explore different screens thereof. Each such screen that is encountered may be captured in a screenshot (470). In some exemplary embodiments, each captured screenshot may be scored. The score may be determined based on the amount of content appearing in the screen, based on its visual attractiveness, based on the layout of the screen, or the like. In some exemplary embodiments, in order to increase chances of approval by the owner of the application store, screens offering functional value may be given higher ranking. In some exemplary embodiments, each module of the parent application that can be used by the specific application may be given a functionality score indicating the amount of functionality such module provides. As an example, "About Us" module or module that otherwise statically displays content may be marked with a low functionality score. However, a meeting scheduler module, may be provided with a high functionality score. A video gallery module may be provided with an intermediate functionality score. Additionally or alternatively, amount of content elements that were populated inside each screen may also be taken into account so as to provide higher ranking to screens with a larger number of populated content elements.

On Step 480, a subset of the screenshots may be selected to be used in the submission. In some exemplary embodiments, the selection is based on the score, such as selecting the screens having the highest scores, scores above a predetermined threshold, or the like.

In some exemplary embodiments, Steps 460-480 may be performed for each different target screen display for which the application store requires or allows submission of screenshots. As an example, APPSTORE™ may require submission of screenshot for IPAD™ device, for IPHONE 5™ device, for IPHONE 6™ device, each having a different screen display. In some exemplary embodiments, different screens may be selected for different screen displays in view of the potential different scoring which may be caused by the different layout, attractiveness, content inclusion, or other factors which may differ when the same screen is displayed in different screen displays.

On Step 490, the app may be submitted to the application store. The submission may comprise creating a new instance on the server of the application store for the app, using the certificate of Step 430 and the identifier of Step 420. In some exemplary embodiments, the store listing details may be populated in the relevant instance of the app on the store server. Listing information may be filled automatically based on obtained information (Step 400). Some information may be calculated automatically according to the content of the app. As an example, content rating declaration (e.g., PG, PG13, R or the like) may be calculated automatically according to the active screens, category, amount and type of content populated by the app owner. For example, apps that include YouTube™ video access may be rated as 12+, while apps that only contain text based content and functionality may be rated as 4+. Additional graphic resources such as Icon and Logo may be generated based on the app's branding. Assets of the app, such as an icon, images, screenshots, media files, or the like, may be uploaded. The executable, such as APK in ANDROID™ or IPA in IOS™, may be uploaded. Additionally or alternatively, submission is completed on the servers of the application store.

Figure 5:
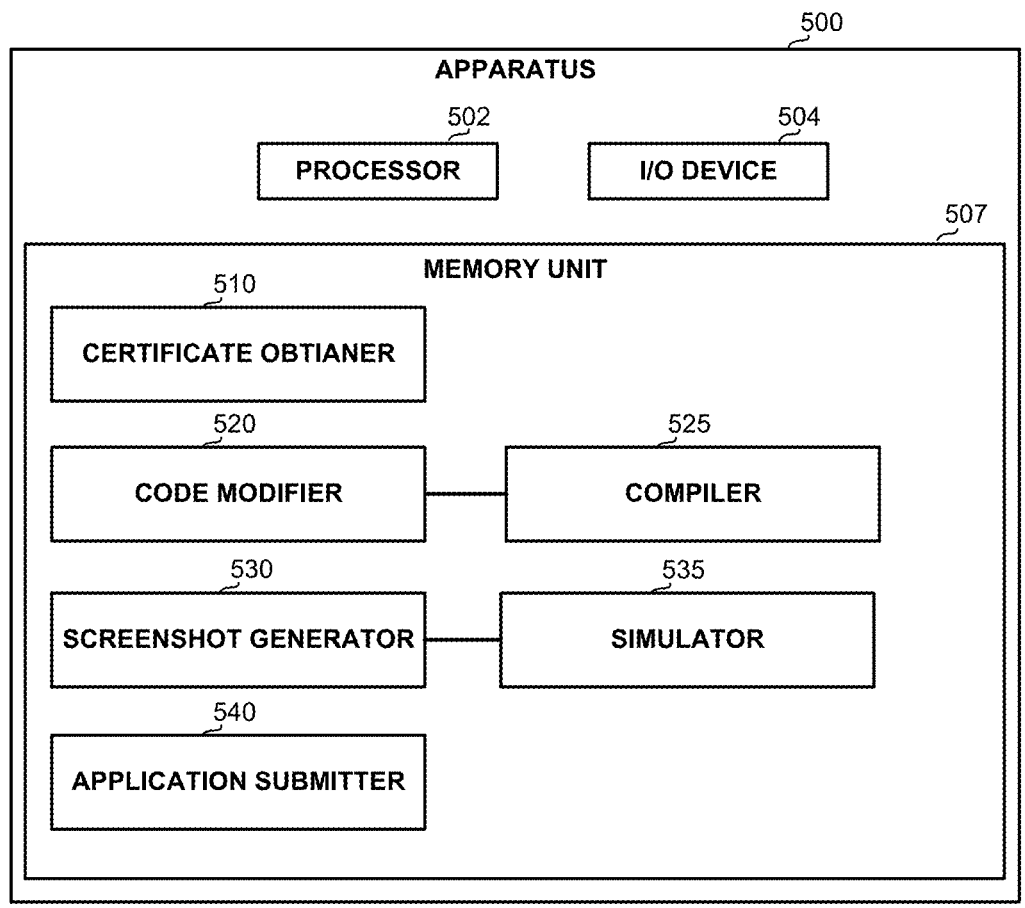
FIG. 5 shows a block diagram of an apparatus adapted to perform automatic submission of applications to an application store, in accordance with some exemplary embodiments of the disclosed subject matter.

In some exemplary embodiments, Steps 410-490 may be performed repeatedly for each different application store. Additionally or alternatively, Referring now to FIG. 5 showing a block diagram of an apparatus adapted to perform automatic submission of applications to an application store, in accordance with some exemplary embodiments of the disclosed subject matter.

Apparatus 500 may comprise a Processor 502 similar to Processor 304, and I/O Device 504, similar to I/O Device 308.

Apparatus 500 may comprise a Memory Unit 507 may be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. Memory Unit 507 may retain computer program instructions capable of causing Processor 502 to perform any of the steps of the method of FIG. 4.

Certificate Obtainer 510 may be configured to cause Apparatus 500 to access a server of an app store, request generation of certificate and retrieve the generated certificate therefrom.

Code Modifier 520 may be configured to modify a code of a parent application to be defined, in a hardcoded manner, to perform the functionality of the specific application. The modification may include modifying the code to have a hardcoded statement setting a value of the command argument provided to the application to be the identifier causing the parent application to provide the functionality of the specific application. In some exemplary embodiments Code Modifier 520 may invoke Compiler 525 to compile the modified code. Compiler 525 may use a certificate, such as obtained by Certificate Obtainer 510, for compilation.

Screenshot Generator 530 may be configured to invoke a Simulator 535 to execute the app with respect to different target device screens. Screenshot Generator 530 may be further configured to provide stimuli to the simulated execution which causes switching from one screen to the other, preferably in an exhaustive manner reaching to all screens of the app, and capturing screenshots of the simulated screens. Each such screen may be ranked with a score and based on the scores screens to be submitted to the app store may be selected.

Application Submitter 540 may be configured to connect to the app store and submit the application.

The disclosed subject matter is described above with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a wired network, a wireless network, a combination thereof, or the like.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatic submission of a specific application to an application store, wherein the specific application is configured to be executed by executing an executable of a parent application, wherein the parent application is configured, when being executed by a mobile device, to retrieve a configuration of the specific application, wherein the configuration describes for the parent application a manner to provide a functionality of the specific application through a use of at least one module, wherein the parent application is configured to activate the at least one module to provide the functionality of the specific application by the parent application, whereby the functionality of the specific application is provided by the executable of the parent application and without using a separate executable for the specific application, the method comprising:

generating an identifier for the specific application in an application store;

providing the identifier to a server of the application store to generate a certificate;

for each target screen size defined by the application store, simulating execution of the specific application while having a display size set to the target screen size, wherein during said simulating, storing a plurality of screenshots of the specific application;

automatically determining a score for each screenshot of the plurality of screenshot with respect to each target screen size;

for each target screen size, selecting a subset of the plurality of screenshots based on the scores; and automatically submitting the specific application to the application store using the certificate, wherein said submitting comprises uploading at least a portion the plurality of screenshots, wherein said uploading comprises uploading the subset of plurality of screenshots, whereby screenshots are selected based on a score-based selection criteria to represent the specific application in the application store.

2. The method of claim 1, wherein said method is performed a plurality of times, each time with respect to a different application store.

3. The method of claim 1 further comprises:
modifying a code of the parent application to mimic providing the parameter when executing the parent application;

compiling the modified code using the certificate; and
wherein said simulating comprises simulating execution of the compiled modified code.

4. The method of claim 1, wherein the at least one module is selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customers module; a meeting scheduler module; a team management module; a meeting scheduler module; a sharing module; a bump module; a forum module; a customer reviews module; a push notification module; and a shopping module.

5. An apparatus for automatic submission of a specific application to an application store, wherein the specific application is configured to be executed by executing an executable of a parent application, wherein the parent application is configured, when being executed by a mobile device, to retrieve a configuration of the specific application, wherein the configuration describes for the parent application a manner to provide a functionality of the specific application through a use of at least one module, wherein the parent application is configured to activate the at least one module to provide the functionality of the specific application by the parent application, whereby the functionality of the specific application is provided by the executable of the parent application and without using a separate executable for the specific application, the apparatus comprising a processor adapted to perform the steps of:
generating an identifier for the specific application in an application store;
providing the identifier to a server of the application store to generate a certificate;
for each target screen size defined by the application store, simulating execution of the specific application while having a display size set to the target screen size, wherein during said simulating, storing a plurality of screenshots of the specific application;
automatically determining a score for each screenshot of the plurality of screenshot with respect to each target screen size;
for each target screen size, selecting a subset of the plurality of screenshots based on the scores; and
automatically submitting the specific application to the application store using the certificate, wherein said submitting comprises uploading at least a portion the plurality of screenshots, wherein said uploading comprises uploading the subset of plurality of screenshots, whereby screenshots are selected based on a score-based selection criteria to represent the specific application in the application store.

6. The Apparatus of claim 5, wherein said processor is configured to perform said steps a plurality of times, each time with respect to a different application store.

7. The Apparatus of claim 5, wherein said processor is further adapted to perform the steps of:
modifying a code of the parent application to mimic providing the parameter when executing the parent application;
compiling the modified code using the certificate; and
wherein said simulating comprises simulating execution of the compiled modified code.

8. The Apparatus of claim 5, wherein the at least one module is selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customer's module; a meeting scheduler module; a team management module; a meeting scheduler module; a sharing module; a bump module; a forum module; a customer reviews module; a push notification module; and a shopping module.

9. A computer program product for automatic submission of a specific application to an application store, wherein the specific application is configured to be executed by executing an executable of a parent application, wherein the parent application is configured, when being executed by a mobile device, to retrieve a configuration of the specific application, wherein the configuration describes for the parent application a manner to provide a functionality of the specific application through a use of at least one module, wherein the parent application is configured to activate the at least one module to provide the functionality of the specific application by the parent application, whereby the functionality of the specific application is provided by the executable of the parent application and without using a separate executable for the specific application, said computer program product comprising a non-transitory computer readable storage medium retaining program instructions, capable of tangibly embodying program instructions, which program instructions when read by a processor, cause the processor to perform a method comprising:
generating an identifier for the specific application in an application store;
providing the identifier to a server of the application store to generate a certificate;
for each target screen size defined by the application store, simulating execution of the specific application while having a display size set to the target screen size, wherein during said simulating, storing a plurality of screenshots of the specific application;
automatically determining a score for each screenshot of the plurality of screenshot with respect to each target screen size;
for each target screen size, selecting a subset of the plurality of screenshots based on the scores; and
automatically submitting the specific application to the application store using the certificate, wherein said submitting comprises uploading at least a portion the plurality of screenshots, wherein said uploading comprises uploading the subset of plurality of screenshots, whereby screenshots are selected based on a score-based selection criteria to represent the specific application in the application store.

10. The computer program product of claim 9, wherein said program instructions, when read by the processor, cause the processor to perform the method a plurality of times, each time with respect to a different application store.

11. The computer program product of claim 9, wherein said program instructions when read by a processor, further cause the processor to perform the steps of:
modifying a code of the parent application to mimic providing the parameter when executing the parent application;
compiling the modified code using the certificate; and
wherein said simulating comprises simulating execution of the compiled modified code.

12. The computer program product of claim 9, wherein the at least one module is selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customers module; a meeting scheduler module; a team management module; a meeting scheduler module; a sharing module; a bump module; a forum module; a customer reviews module; a push notification module; and a shopping module.

* * * * *